(12) United States Patent
Thuo et al.

(10) Patent No.: US 10,604,677 B2
(45) Date of Patent: Mar. 31, 2020

(54) FABRICATION OF MICRO- AND NANO-PARTICLE COATED MATERIALS

(71) Applicant: UNIVERSITY OF MASSACHUSETTS, Boston, MA (US)

(72) Inventors: Martin Thuo, Ames, IA (US); Ian Tevis, Brighton, MA (US); Stephanie Oyola-Reynoso, Ames, IA (US)

(73) Assignee: University of Massachusetts, Boston, MA (US)

( * ) Notice: Subject to any disclaimer, the term of this patent is extended or adjusted under 35 U.S.C. 154(b) by 249 days.

(21) Appl. No.: 15/521,510

(22) PCT Filed: Oct. 30, 2015

(86) PCT No.: PCT/US2015/058369
§ 371 (c)(1),
(2) Date: Apr. 24, 2017

(87) PCT Pub. No.: WO2016/070077
PCT Pub. Date: May 6, 2016

(65) Prior Publication Data
US 2017/0306183 A1    Oct. 26, 2017

Related U.S. Application Data

(60) Provisional application No. 62/073,620, filed on Oct. 31, 2014.

(51) Int. Cl.
C09D 183/08 (2006.01)
C09D 183/04 (2006.01)
C09D 5/00 (2006.01)
C08G 77/24 (2006.01)

(52) U.S. Cl.
CPC ............. *C09D 183/08* (2013.01); *C09D 5/00* (2013.01); *C09D 183/04* (2013.01); *C08G 77/24* (2013.01)

(58) Field of Classification Search
CPC ....... C09D 183/08; C09D 5/00; C09D 183/04
See application file for complete search history.

(56) References Cited

U.S. PATENT DOCUMENTS

| 2007/0141365 | A1* | 6/2007 | Jelle | B05D 1/185 428/447 |
| 2008/0241512 | A1* | 10/2008 | Boris | B05D 1/60 428/328 |
| 2009/0192429 | A1* | 7/2009 | Daniels | A61B 17/0057 602/43 |
| 2010/0035074 | A1* | 2/2010 | Cohen | B05D 1/62 428/500 |
| 2011/0165808 | A1* | 7/2011 | Zimmermann | C09D 4/00 442/81 |
| 2013/0165350 | A1 | 6/2013 | Kuimelis et al. | |

* cited by examiner

*Primary Examiner* — Kelly M Gambetta
(74) *Attorney, Agent, or Firm* — Renner, Otto, Boisselle & Sklar, LLP

(57) ABSTRACT

According to various aspects and embodiments, materials having a modified surface to increase hydrophobicity and methods of making the same are disclosed. In accordance with one or more aspects, a method of enhancing a surface of a substrate may comprise bonding silane monomers onto the surface of the substrate, and polymerizing the silane monomers to form surface-attached hydrophobic particles comprising silane polymers.

14 Claims, 6 Drawing Sheets

FABRICATION OF MICRO- AND NANO-PARTICLE COATED MATERIALS

CROSS-REFERENCE TO RELATED APPLICATIONS

This application is a U.S. national phase application and claims the benefit of priority under 35 U.S.C. § 371 of International (PCT) Patent Application Serial No. PCT/US2015/058369, titled "FABRICATION OF MICRO- AND NANO-PARTICLE COATED MATERIALS," filed Oct. 30, 2015, which in turn claims priority under 35 U.S.C. § 119(e) to U.S. Provisional Patent Application Ser. No. 62/073,620, titled "ONE-STEP FABRICATION OF MICRO- AND NANO-PARTICLE COATED MATERIALS," filed Oct. 31, 2014, which is hereby incorporated herein by reference in its entirety for all purposes.

TECHNICAL FIELD

The technical field relates generally to the modification of a substrate to impart hydrophobic properties.

SUMMARY

In accordance with one or more aspects, a method of enhancing a surface of a substrate may comprise bonding silane monomers onto the surface of the substrate, and polymerizing the silane monomers to form surface-attached hydrophobic particles comprising silane polymers.

In some aspects, the substrate is hydrophilic. In at least some aspects, the substrate is a porous material. The substrate may be cellulose or silicon in some non-limiting aspects. Polymerizing the silane monomers may comprise controlling an amount of water present on or in the substrate. Polymerizing the silane monomers may comprise controlling a rate of crosslinking of silane polymers. The substrate may comprise a pre-patterned microfibril network and bonding may occur at predetermined positions on the pre-patterned microfibril network. In some aspects, bonding may comprise performing chemical vapor deposition. Chemical vapor deposition may be performed at or below atmospheric pressure. Chemical vapor deposition may be performed at a predetermined temperature in the range of about 25° C. to about 100° C. to optimize an evaporation rate and reaction rate during bonding.

In at least some aspects, bonding may comprise controlling one or more of the parameters of temperature and reaction time. The method may further comprise controlling a surface roughness by controlling the degree of crosslinking during polymerization. Polymerizing the monomers may further comprise forming a surface-attached hydrophobic film.

In accordance with one or more aspects, a micro- or nano-particle coated material may comprise a hydrophilic substrate having a surface that is partially exposed and partially covered with a polymerized hydrophobic species bonded to the surface.

In some aspects, the substrate may comprise one of cellulose or silicon. The polymerized hydrophobic species may be in the form of particles. The polymerized hydrophobic species may be stochastically distributed across the surface. In at least some aspects, the polymerized hydrophobic species may comprise a silane species. The substrate may comprise a pre-patterned microfibril network.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
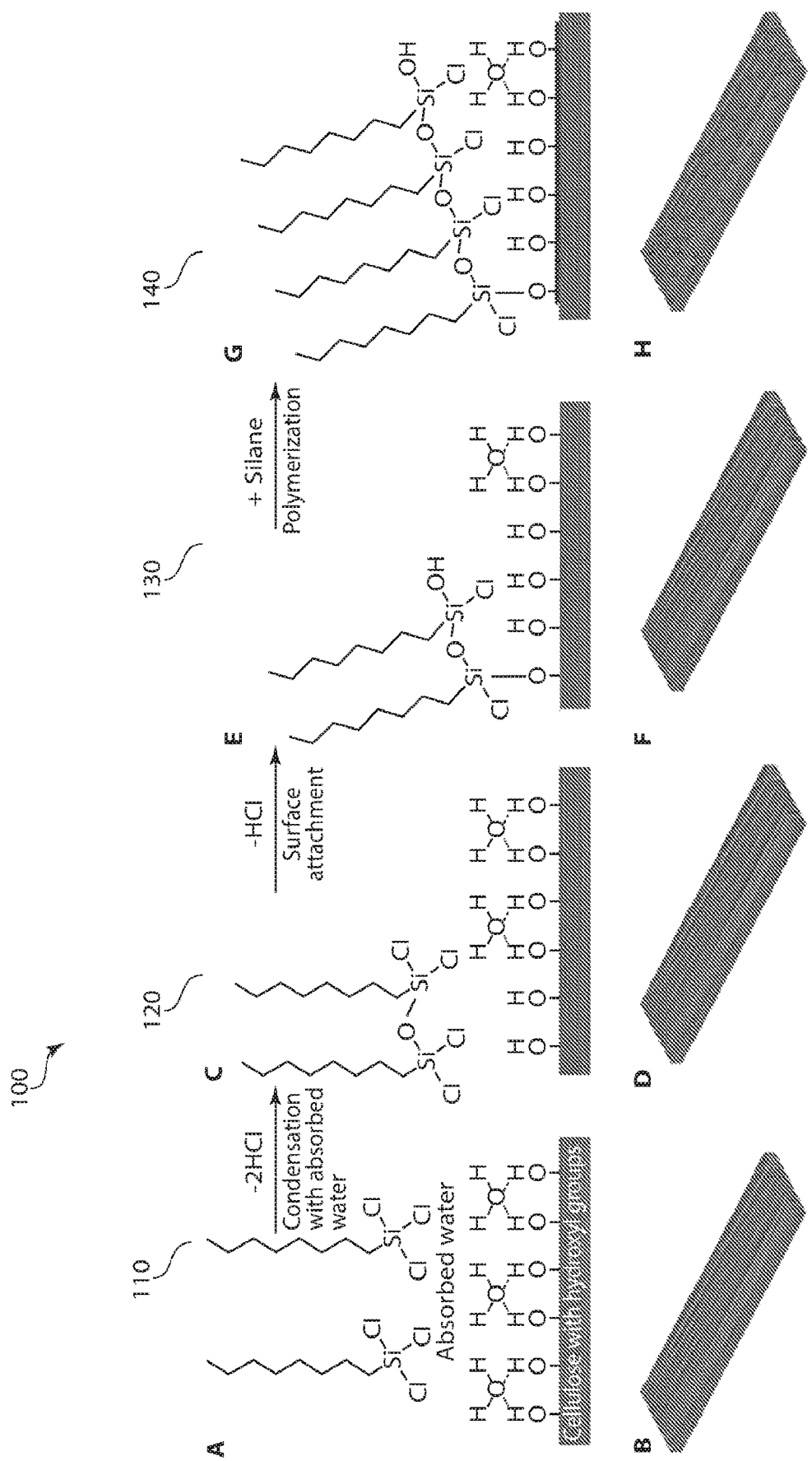
FIG. 1 is a schematic of a surface modification process in accordance with one or more aspects of the invention.

Aspects of the disclosure provide a method of growing particles into micro- and nano-particles and/or film(s) on porous or solid surfaces, including paper surfaces. One or more of the methods disclosed herein may be used to fabricate hydrophobic materials based on surface functionalization, such as covalent attachment, of hydrophobic molecules onto porous and solid substrates using a reagent containing two or more substituents. This process may be followed by modification of the substrate's surface roughness by polymerizing the reagent at the interface between the substrate and the vapor phase of the reagent, i.e., interfacial polymerization.

According to at least one specific aspect, methods of growing polymerized particles of alkyltrichlorosilane that are covalently attached to a substrate are provided. The reaction may be controlled based on temperature, reaction time, and the type of reagent to create rapid attachment of the reagent to the substrate and subsequent growth into particles and/or films.

According to a further aspect, one or more of the methods disclosed herein use self-assembly and Ostwald-type ripening to control the particle size, density, and coverage of the particles for the purposes of controlling the degree of hydrophobicity or cross-linking. This may be accomplished by choosing different reaction conditions and/or reagent(s) when growing the particles on the substrate.

Aspects of this disclosure relate to systems and methods of growing nano- and micro-particles on porous or nonporous (solid) substrates. At least one embodiment is directed to growing nanoparticles on a cellulose substrate, such as paper. Aspects of the disclosure include combining surface science and condensation polymerization of polyfunctional monomers, e.g., silanes such as perfluorooctyl silane which is trifunctional, i.e., f=3, and water which is difunctional, i.e., f=2, to form various films, including gels. Generally speaking, the degree of polymerization may be controlled by controlling the amount of water and/or the amount of reagent, such as silane. Further, when reaction conditions fall outside certain parameters, then no polymerization occurs, and subsequently, no gel, is formed.

According to at least one aspect, the amount of water may be controlled by selectively drying the cellulose substrate, such as paper, and reacting the water exposed on the surface of the paper with the monomer of the reagent. Further, paper may contain up to three different types or categories of water: (1) water on the paper fiber, (2) water inside the paper fiber, and (3) water of crystallization. Therefore, reacting the paper with the monomer may access each of these types of water in a thermal/diffusion controlled process, with water on the fiber being the most accessible (so it reacts first), followed by water inside the fibers, and finally water of crystallization, which is the most difficult to access. As explained further below, as the silanes are polymerized, the hydrophobic tails orient on one side to keep water away from the reactive silane head, which slows down the reaction.

According to at least one aspect, the modified cellulosic substrate may have a water contact angle greater than 90°, as measured by a goniometer, which renders the substrate hydrophobic (hydrophilic species have a water contact angle less than 90°). According to some embodiments, the modified cellulosic substrate has a contact angle of more than 100°, 115°, 120°, 130°, or 140°.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Still other aspects, embodiments, and advantages of these example aspects and embodiments are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described may be included in at least one embodiment. The appearances of such terms herein are not necessarily all referring to the same embodiment.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Moreover, titles or subtitles may be used in the specification for the convenience of a reader, which shall have no influence on the scope of the present invention.

Substrate Materials

According to at least one aspect, one or more substrate materials may be modified to increase their hydrophobicity. The substrate material may be a porous or a solid material, such as cellulose or silicon, respectively.

Non-limiting examples of suitable porous substrates, all of which collectively fall under the term "cellulose" unless specifically stated otherwise, include cellulose, derivatives of cellulose such as nitrocellulose or cellulose acetate; paper, such as craft paper, card stock, filter paper, chromatography paper, vellum paper, printing paper, wrapping paper, ledger paper, bank paper, bond paper, blotting paper, drawing paper, fish paper, tissue paper, paper towel, wax paper, and photography paper; non-woven cellulosic materials; and thin films of wood. According to some embodiments, the cellulosic substrate is paper having a grammage of greater than 50, 60, 70, 75, 85, 100, 125, 150, 175, 200, 225, or 250 g/m2.

Modified Surface

In accordance with one or more embodiments, the substrate may be modified according to processes further described below to produce micro- or nano-particle coated material with varying surface characteristics, such as degree of hydrophobicity/hydrophilicity. According to some embodiments, a hydrophilic substrate may have a surface that is partially exposed and partially covered with a polymerized hydrophobic species bonded to the surface. The substrate may comprise cellulose or silicon. The polymerized hydrophobic species may comprise a silane species, examples of which are discussed below. The polymers may form particles on the surface, the size and number of which may be controlled through controlling process variables such as amount of water present, time of reaction, temperature of reaction, reagent amount/species, etc. The formed particles may be stochastically distributed across the surface of the substrate. According to some embodiments, the surfaces may be characterized as having hydrophobic bumps and hydrophilic trenches. In some embodiments, where the entire or substantially entire surface is covered, the coverage may be referred to as a film. The produced surfaces have applications in controlled liquid condensation and delivery.

According to certain embodiments, the particles formed through the disclosed processes may have a solid core. Alternatively, gaps may be observed in the formed particles indicative of the presence of trapped gases or gaseous by-products arising from the reaction.

Process for Surface Modification

In accordance with one or more embodiments, a method for enhancing a surface of a substrate, such as a cellulosic substrate, is provided. The method may comprise bonding silane monomers or oligomers onto the surface of the substrate. The silane monomers or oligomers may then be polymerized to form surface-attached hydrophobic particles comprising silane polymers. In some embodiments, the substrate material is covalently modified to increase the hydrophobicity of the surface. For example, hydroxyl groups present on the surface of the substrate may be covalently functionalized to increase the hydrophobicity of the material.

According to at least one embodiment, a chemical vapor deposition method may be performed using a liquid source for the vapor precursor. The deposition may take place at either reduced or atmospheric pressure. In some embodiments, the liquid source may be a reagent comprising a silane species. Examples of a silanizing reagent include, without limitation, alkyltrichlorosilane or fluorinated alkyltrichlorosilane, although other silanizing reagents and vapor precursors are within the scope of this disclosure. For example, suitable silanes may include linear or branched alkyl-, fluororalkyl-, or perfluororoalkyl-trihalosilanes, and alkylaminosilanes.

According to various embodiments, the substrate may be placed into a chamber with a container, such as a glass vial, of the precursor source liquid. The chamber is evacuated and heated to a predetermined temperature to increase the evaporation rate of the precursor source liquid and the rate of the reaction of the precursors with the substrate. The surface hydroxyl groups of the cellulosic substrate react with the vaporized precursor to form surface linkages via a covalent bond. Further, water from either the substrate or the atmosphere in the chamber may enable the polymerization of the precursors on the surface. The substrate is allowed to react for a predetermined time and then removed from the chamber. Thus, the precursor is covalently attached to the substrate to form covalent bonds.

According to another embodiment, the surface hydroxyl groups of the cellulosic substrate are acylated by reaction with one or more hydrophobic groups functionalized with an acid chloride, such as an alkyl acyl chlorides or fluorinated alkyl acyl chlorides. Examples of suitable hydrophobic groups include linear, branched, or cyclic alkyl groups; linear, branched, or cyclic alkynyl groups, aryl groups, heteroaryl groups, optionally substituted with between one and five substituents individually selected from linear, branched, or cyclic alkyl, linear, branched, or cyclic alkenyl, linear, branched, or cyclic alkynyl, alkoxy, amino, halogen, nitrile, CF3, ester, amide, aryl, and heteroaryl. The hydrophobic group may also be a fluorinated or perfluorinated analog of any of the groups described above. The introduction of the halogenated functional groups forms glycosidic linkages with the surface hydroxyl groups of the cellulosic substrate. However, unlike the silanizing reagent described above, the glycosidic linkages do not polymerize to form particles, but rather form monolayers.

In accordance with at least some aspects, methods of growing polymerized particles that are covalently attached to a substrate are provided. The reaction may be controlled based on temperature, reaction times, and the type of reagent/precursor used for the purposes of creating rapid attachment of the precursor to the substrate and the subsequent growth of particles.

According to some embodiments, increasing the temperature of the reaction speeds up vaporization of the silane as well as the rate of the reaction of the precursors with the substrate, and in addition, further functions to liberate water from the substrate. Further, increasing the temperature of the reaction increases the migration rate of silanes on the surface of the paper and the occurrence of reverse condensation reactions, as explained further below.

According to certain aspects, the longer the condensation reaction occurs, the larger in size the polymer particles grow, and the more surface area of the substrate is covered. For example, reactions that occur at room temperature (i.e., 20-26° C.) conditions grow particles at different sizes than reactions that occur at 95° C. The degree of polymerization at the lower temperature is lower than at the higher temperature, and hence, the particles grow at a slower rate. For example, increasing the reaction time may increase the size of the particles through a process known as Ostwald ripening. Over time the particles get larger, but over longer periods of time a reverse condensation reaction may occur, which results in the particle sizes decreasing as alkysilanes migrate away to cover more of the substrate surface. Longer periods of reaction time result in the continuous formation of films, i.e., separate particles are no longer formed.

According to a further aspect, and as discussed below in reference to FIGS. 2 and 3 and Examples 2 and 3, the reaction conditions may be optimized to produce particles of different sizes, densities, and contact angles. In certain instances, the size and density may be controlled to yield particles with the highest water contact angles.

Figure 2:
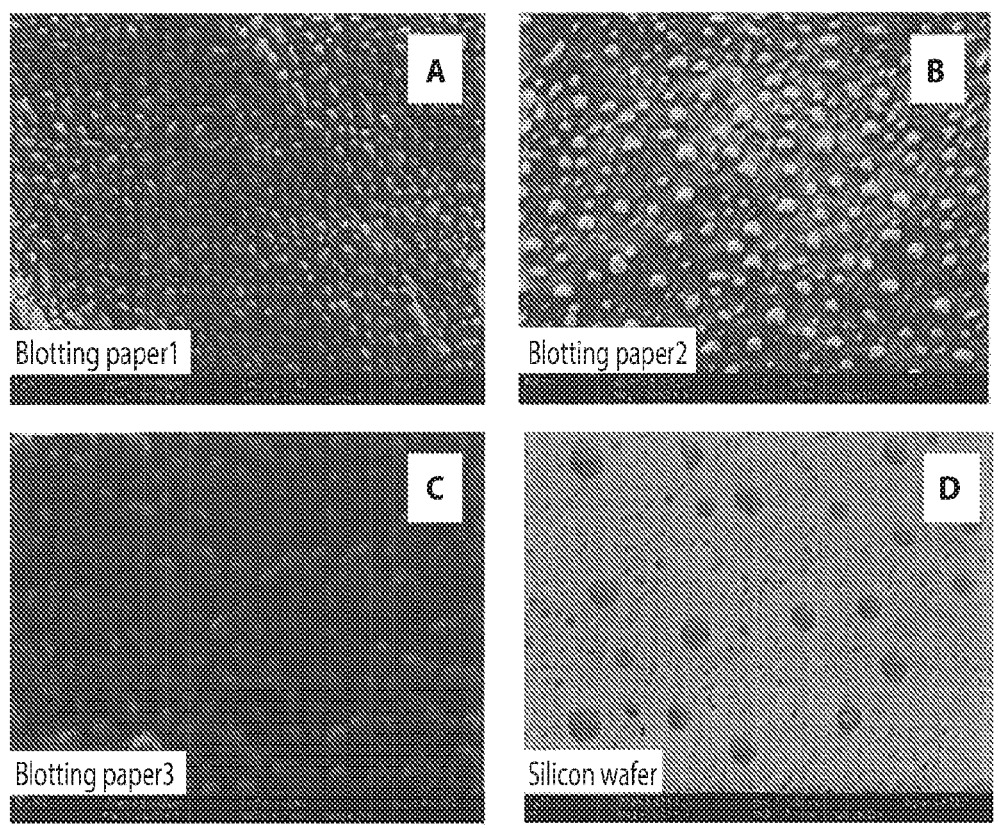
FIG. 2 shows examples of modified hydrophobic surfaces in accordance with one or more aspects of the invention.

Referring to FIG. 2, four different examples (parts A-D) of modified surfaces in accordance with certain aspects of this disclosure are shown. As mentioned above, by controlling the reaction temperature, time, and reagent, different degrees of roughness, i.e., particle size, may be produced. For example, FIG. 2, part A shows blotting paper that has been reacted with trichloro(1H, 1H, 2H, 2H-perfluorooctyl) silane in a chamber at reduced pressure for one hour at 95° C. In contrast, FIG. 2, part C shows blotting paper that has been reacted under the same conditions as part A, but for a time period of 5 hours. As evidenced in the figures, the longer time period yields larger particles and more surface coverage. FIG. 2, part B shows blotting paper that has been reacted in a chamber under similar conditions as parts A and C, but at a reduced temperature of 50° C. and a time period of 24 hours. FIG. 2, part D, illustrates the preparation of a solid surface using the methods described above. A surface was prepared using a square centimeter of silicon wafer. The silicon wafer was suspended over a vial containing 1 mL of trichloro(1H, 1H, 2H, 2H-perfluorooctyl)silane at atmospheric pressure. The vial was heated with a heat gun to 100° C. and the silicon substrate was reacted with the hot silane vapor for 5 minutes.

Figure 3:
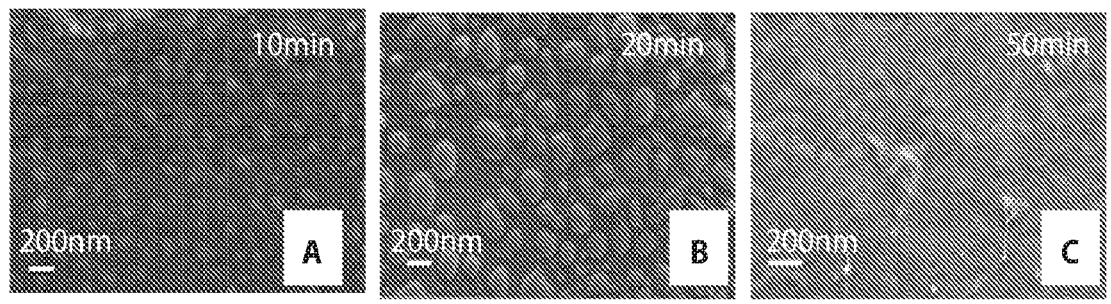
FIG. 3 shows examples of modified hydrophobic porous surfaces in accordance with one or more aspects of the invention.
Figure 4:
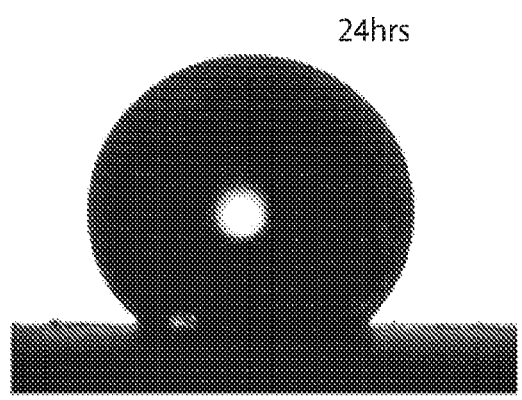
FIG. 4 shows an image of a water droplet on a porous surface in accordance with one or more aspects of the invention.

Referring to FIG. 3, three different examples (parts A-C) of modified surfaces are shown and illustrate the progression from smaller to larger particles and finally to the formation of a film. For example, FIG. 3, part A shows a blotting paper substrate reacted at a reduced pressure with trichloro(1H, 1H, 2H, 2H-perfluorooctyl)silane for 10 minutes at 95° C. Part B of FIG. 3 shows the paper substrate reacted under the same conditions for 20 minutes, and part C of FIG. 3 shows the results after a reaction time of 50 minutes. The shorter period of time shown in part A indicates the formation of smaller particles that grow to the larger particles shown in part B and then finally to the formation of a film exhibiting complete coverage as shown in part C. In accordance with certain aspects, parts A-C of FIG. 3 show evidence of the reverse condensation reaction and the formation of a film. The sizes of the particles visible as "bumps" in part C of FIG. 3 are smaller than those in part B. Further, part C shows evidence of complete coverage of the substrate by the polymerized molecule with no bare areas of paper.

Without being bound to a particular theory, it is believed that controlled reacting of a surfactant molecule like an alkyl trichlorosilane with a material bearing a hydrophilic surface would lead to formation of particles of controlled size but stochastically distributed across the surface. A hydrophilic surface, with its adsorbed water, would allow for the alkyl trichlorosilane to oligomerize before contacting the surface allowing the use of surface adsorbed water as a monomer in a step-growth polymerization process. It therefore follows that, since water has two reactive sites and while an alkyl trichlorosilane has three (for equimolar quantities, f=5), the critical coefficient of branching, $\Box_c$, for gel formation is 0.25. It therefore follows that, for the gel to form ($\Box(f-1)$ ≥1), assuming that all the water and silane react, the ratios of the alkylsilane to the adsorbed water, or vice-versa, should be 0.25 allowing us to predict, and control, the gel formation process (Equation 1).

$$\alpha = \frac{r\rho P_A^2}{1 - r(1-\rho)P_A^2} \quad (1)$$

Where $P_A$ is the probability of functional group A being in the gel, $\rho$ is the probability of a moiety being in the branches of the gel, and, r is the ratio of the total number of reacting functionalities.

According to certain embodiments, particles of different sizes and shapes can be formed through the covalent attachment of a silane species, for example an alkyl-silane, on cellulose with cross-linking by surface adsorbed water, followed by concomitant self-assembly of the oligomeric and polymeric chains. This process may be characterized as a three-stage surface polymerization: i) oligomerization of the alkylsilane vapor through reaction with ambient water vapor and eventually surface-bound water, ii) attachment of the oligomerized alkylsilane (macromonomers) on the surface, iii) cross-linking to give oligomer/polymerparticles that can grow further, eventually growing into a film on the surface of the paper fibers.

A schematic of a process 100 for modifying a substrate surface, in accordance with one or more embodiments, is shown in FIG. 1. According to process 100, hydroxyl groups on the substrate surface react with a silane species vapor (trichloroalkyl silane vapor according to this embodiment) to form hydrophobic particles on the surface. At step 110, trichloroalkyl silane moleculares are vaporized and travel through the desiccator to the surface of the paper. At step 120, these trichloroalkyl silane molecules then react in a condensation reaction with surface adsorbed water to form a short oligomer. At step 130, the small oligomerized alkyl silane molecule reacts with surface hydroxyl groups of the cellulose in a condensation reaction to attach to the paper and release HCl. At step 140, additional surface absorbed water is released from the paper providing reactant for further polymerization of the fluoroalkyl silane into polymer particles.

Template-Driven Self-Assembly

According to a further aspect, a template-driven self-assembly process may be performed. For example, the cellulosic substrate, such as paper, may be naturally or synthetically pre-patterned with a microfibril network. Templating occurs when, for example, the oligomeric silanes attach to the paper fibers at predetermined locations. For instance, the polymerization at the paper-air interface may occur only at sterically dictated locations defined by the microfibril network. The density of the microfibrils affects the growth kinetics and distribution of the particles on the substrate and localizes the growth of the particles into specific regions or patterns. The resulting film thickness, structure, and/or organization may affect both the thermal and mechanical properties of the modified paper substrate. According to certain aspects, the resulting structure may possess one or more physical characteristics, such as water wicking or directional fluid flow.

Modification of Surface Roughness

According to one or more embodiments, and as explained further below in the first example, the surface roughness of the hydrophobic molecules formed on the substrate may be modified by controlling the degree of crosslinking. According to certain aspects, controlling the amount of available reagent also controls the degree of polymerization and hence the size of the resulting particles.

According to certain aspects, reagents that contain any functional group that is capable of condensation polymerization and includes two or more functional groups that can react with water may be used to control the degree of crosslinking. The reactive sites do not have to be on the same atom, but may be on the same molecule. For example, non-limiting examples of suitable materials may include any dihalogenated silanes, any molecule with two or more acyl halide groups, or any molecule with two or more epoxide groups, and the like, may be used. As explained above, one of the central concepts is that the condensation reaction follows coupling of similarly reacted molecules, i.e., the kinetics follow condensation polymerization and the degree of crosslinking may be calculated as described above in reference to gel formation using this mechanism.

EXAMPLES

The functions and advantages of the embodiments discussed above will be more fully understood from the examples outlined below. The following examples are intended to be illustrative in nature, and are not intended to limit the scope of the disclosure.

Example 1

Modification of Surface Roughness

The surface roughness of the hydrophobic molecules formed on a cellulosic fibrous substrate, which may contain fillers, was controlled using a desiccator. The substrate was first cut into square centimeter pieces and then placed into a preheated (95° C.) 2.4 L PYREX™ desiccator containing calcium sulfate as a drying reagent. A 5 mL quantity of trichloro(1H,1H,2H,2H-perfluorooctyl)silane was placed in a glass vial and then into the desiccator with the substrate. The desiccator was then evacuated using a vacuum pump and sealed. The desiccator was further placed into an oven at 95° C. for 20 minutes.

Without being bound by theory, the evacuated environment is thought to help vaporize more of the alkyltrichlorosilane and the elevated temperature is thought to help further vaporize the alkyltrichlorosilane and speed up the covalent bond-forming condensation reaction of the silane with the substrate at the interface between the surface of the substrate and the vapor precursor. It is theorized that this leaves a partially reacted silane on the surface of the substrate that can further react multiple times via condensation reactions with either neighboring covalently attached alkyltrichlorosilanes or alkyltrichlorosilane vapor. Since the precursors are surfactants, i.e., they have a polar (Si end) and a non-polar (fluorinated tail) structure, they will assemble analogous to a micelle, such as soap, which gives the particles a defined surface energy. This surface energy is dependent on how the particles assemble on the surface and is driven, in part, by the fact that the paper surface is fluorinated, which attracts the silane end of the precursor. As the polymerization process progresses, it is theorized that the polar ends will orient on one side and all the hydrophobic tails will orient on the other side to give a micelle or bi-layer type assembly. According to one aspect, if a bi-layer forms, the assembly will not attach to the paper, but a micellar type assembly will continue to react with surface water molecules and eventually get attached to the paper. In certain instances this assembly process dictates how the particles are anchored to the surface, and is therefore not just dependent on the reaction/polymerization process described above.

According to some aspects, the condensation reaction requires a source of hydroxide (OH), primarily from water. The water may be produced from the substrate or introduced into the desiccator. The water reacts with a chlorosilane group to form an SiOH group and HCl. The SiOH group reacts with neighboring SiOH or SiCl groups in a condensation reaction to produce polymers. The polymerization forms hydrophobic particles on the surface of the substrate with bare areas of hydrophilic paper between them. Once the attachment and subsequent polymerization have formed particles of sufficient size and density to achieve the desired water contact angles, the desiccator is removed from the oven and filled with air. The substrates may then be removed from the chamber.

Examples 2 and 3

Optimized Hydrophobicity

A hydrophobic surface on filter paper was created using a process similar to that described above. Filter paper was reacted in a chamber with trichloro(1H,1H,2H,2H-perfluorooctyl)silane at 95° C. for 24 hours, under vacuum. FIG. 3 is an example of a water droplet disposed on the resulting modified cellulosic substrate. As shown, the modified cellulosic substrate has a contact angle with water of 141°.

An additional surface was prepared using blotting paper. The blotting paper was reacted in the chamber with trichloro(1H,1H,2H,2H-perfluorooctyl)silane at 95° C. for 20 minutes, under vacuum. The resulting modified cellulosic substrate had a contact angle with water of 120°.

Example 4

Figure 5:
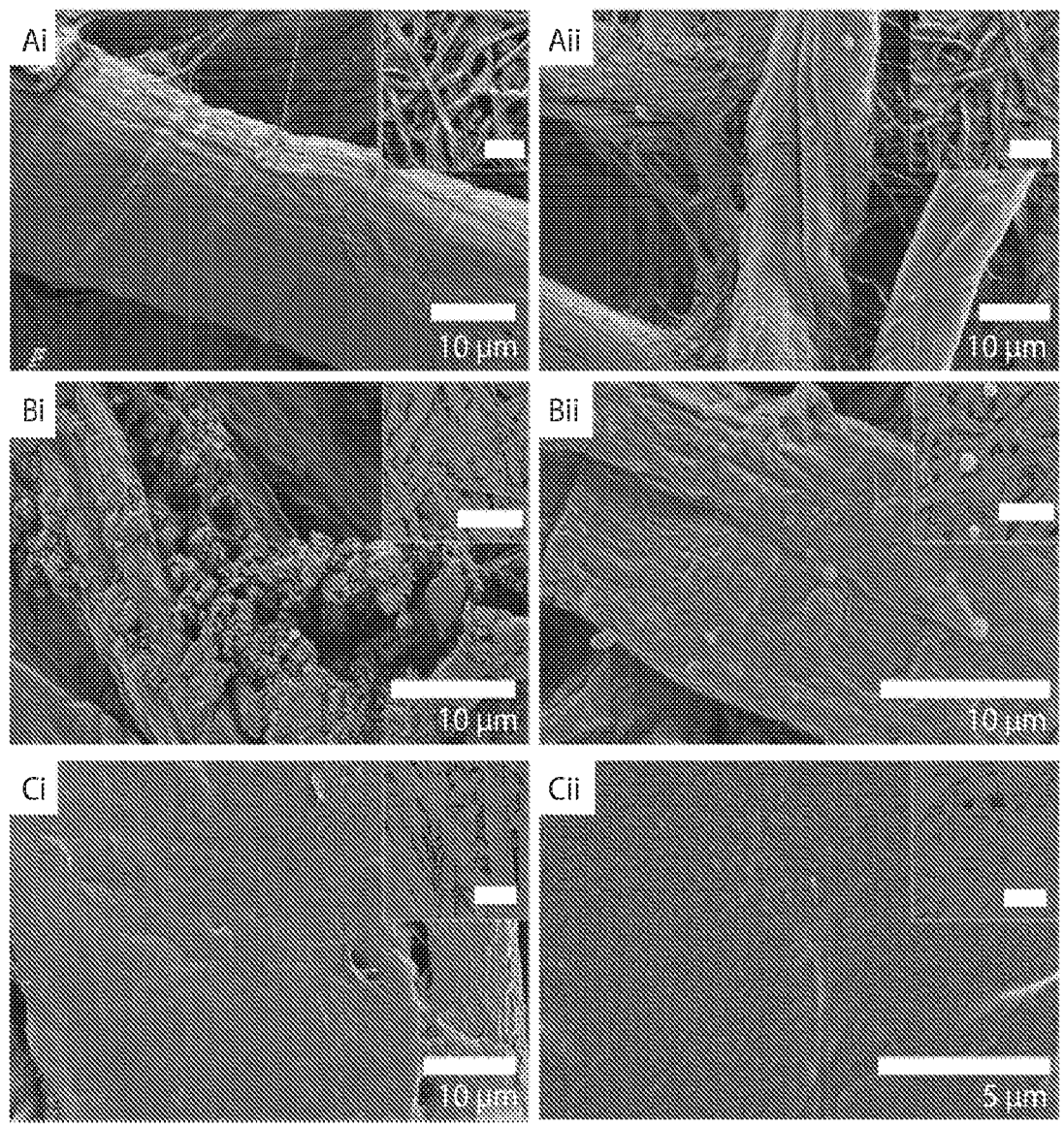
FIG. 5 shows examples of modified hydrophobic porous surfaces in accordance with one or more aspects of the invention.

Adsorbed Surface Water as a Cross-linker in Surface Step-growth Polymerization of Octyltrichlorosilane Surface modification procedures were applied to different types of paper for different periods of times. FIG. 5 shows scanning electron microscopy (SEM) images of the control paper and the treated analogs over different reaction times. Imaging of the native (control) paper shows the different degrees of roughness and anisotropy in fiber orientation, as shown in the insert in FIG. 5Ai). As expected, different types of papers gave varied results upon treatment with the alkyl silanes.

To fabricate the hydrophobic paper, pre-cut papers were placed in a clean dry desiccator followed by ~0.5 mL of alkylsilane in a 20 mL dram vial. The desiccator was evacuated (~30 mmHg pressure), sealed, and placed in an oven that had been pre-heated to 95° C. After a predetermined time, the desiccator was removed from the oven and the paper samples removed to be tested for hydrophobicity by wetting with water, $\theta_s$=108-149°, while equivalent samples was used for characterization. The reaction was performed with octyltrichlorosilane or its fluorinated analog, trichloro(1H,1H,2H,2H-perfluorooctyl)silane. Contact angle measurements were performed with a Ramé-Hart 200 (p/n 200-U1) goniometer using 1 μL of de-ionized water. Samples were stabilized and flatten on a glass slide. Contact angle images were collected with a high-resolution camera and analyzed with DROPimage Standard Software.

When a primarily cellulosic material, (Whatman® Chromatography paper #3 or filter paper #1) was subjected to silanization there were no observable differences between the control (shown in FIG. 5a(i)) and the treated paper (shown in FIG. 5a(ii)). To minimize the amount of adsorbed surface water, two main approaches were chosen, viz; additives and increased grammage. Most papers, like cardstock, contain filler materials that can affect the treatment or the mechanical properties of the paper upon treatment. Precipitated calcium carbonate (PCC) is a commonly used filler material, and would react with the HCl byproduct to generate water. Cardstock was therefore used to test the hypothesis that having additives would reduce the amount of surface area onto which water would adsorb onto the paper fibers. Due to the uneven distribution of adsorbed, and available, surface water to react with the silanes, it was hypothesized that large particles that were randomly distributed would be observed and all the PCC would disappear (due to reaction with the acid by-products) upon treatment with the alkyl silanes. FIG. 5b(i) shows the native cardstock paper with a few clusters of the PCC filler visible. FIG. 5b(ii) shows the silanized cardstock paper. Some large particles were observed but due to the nature of the solid-gas reaction and the involvement of surface water, small particles were also observed on the surface.

The observation of small particles on cardstock, alongside the bigger particles randomly distributed on the surface of the fibers, it was hypothesized that slightly reducing the amount of surface adsorbed water that is available to react with the alkyl silane would lead to stochastically distributed polymeric particles forming on the surface of the paper. To test this hypothesis, a high grammage (high fiber density ~164 g/m$^2$ vs 87 g/m$^2$ for chromatography) paper was used.

It was observed that on using a custom cellulosic high density paper, randomly distributed particles were observed on the surface of the fibers. To further test this hypothesis and demonstrate that this is general for all types of paper, not just the custom paper, a thin, commonly used high density paper was used, NYX blotting paper—a paper used in cosmetics to clear oils from skin. It was observed that when this paper was treated with a alkyl silane, a large number of stochastically oriented and located particles were formed on the paper fibers. FIG. 5c(i) shows the structure of the native NYX blotting paper as observed by SEM. FIG. 5c(ii) shows the same paper upon treatment with a alkyl silane.

Example 5

Degree of Polymerization Dictates Average Particle Size and Hydrophobicity

Figure 6:
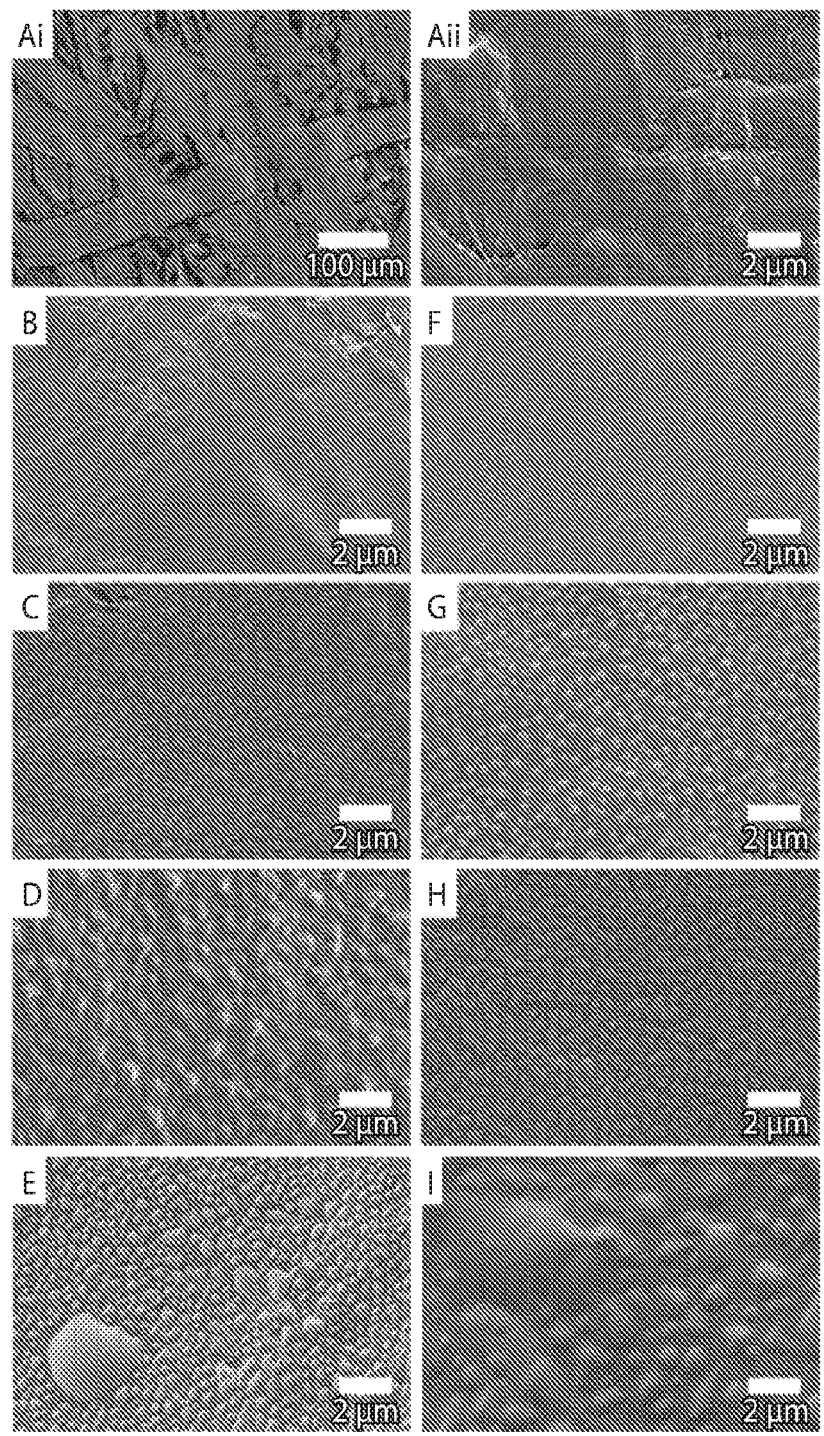
FIG. 6 shows examples of modified hydrophobic porous surfaces in accordance with one or more aspects of the invention.

High grammage paper (~164g/m$^2$), NYX blotting paper, was treated with fluoroalkylsilaneover over different reaction times and temperatures, and different sizes of particles were observed on the surface of the paper ranging from 5 nm (5 mins, 95° C.) to a film on the surface of the paper. FIG. 6 shows the growth of particles over time, at constant temperatures (room temperature and 95° C.). It is observed that, as predicted by step-growth polymerization kinetics, the particles get larger with increased reaction times until such a point that the size seems to start decreasing a film forms on the paper. Over prolonged reaction times, we observe that the particles are buried by a continuous film indicating that the film converges from the top rather than directly from coalescence of the particles. We hypothesized that the convergence from the top is due to the water trapped in the fiber slowly leaching out and reacting the silane vapor on top of an already formed layer of particles. When the reactions were performed for 5 minutes at 95° C., nanoparticles were observed formed on the surface of paper fibers (FIG. 6F).

SEM micrographs of surface polymerization of trichloro (1H,1H,2H,2H-perfluorooctyl)silane on the high grammage NYX blotting paper at room temperature (left column of FIG. 6) and 95° C. (right column of FIG. 6). FIG. 6A shows a control paper at a low magnification. FIG. 6Ai shows a control paper at a high magnification. FIG. 6Aii shows an image of the native paper before silanization. FIGS. 6B-E show the time-course transformation of the surface texture when the polymerization is performed at room temperature for 5 min, 30 min, 300 min, and 24 hours, respectively. FIGS. 6F-I show a time-course surface texture morphogenesis when the reaction is performed at 95° C. for 5 min, 30 min, 300 min, and 24 hours, respectively.

Fluorinated treated paper results for particle sizes and wetting properties upon reaction time gave a trend that can be correlated. This trend validates the transition the chemistry goes from "micelle like" polymer particles to the formation of a monolayer. This transition is possible due to the reduction of water mass in the cellulose and the roughness levels. Particles adds a third layer of roughness to cellulose increasing the surface hydrophobicity, when the reaction time is increased, the particles are reduced and so is the roughness. This reduction is mainly due to unreacted head groups that start to react with other unreacted groups, combining particles together forming a layer. Based on the graph shown on FIG. 7, the highest point of hydrophobicity and particle size was of 60 minutes of reaction time, after this point the changes in the surface chemistry are noticeable.

Figure 7:
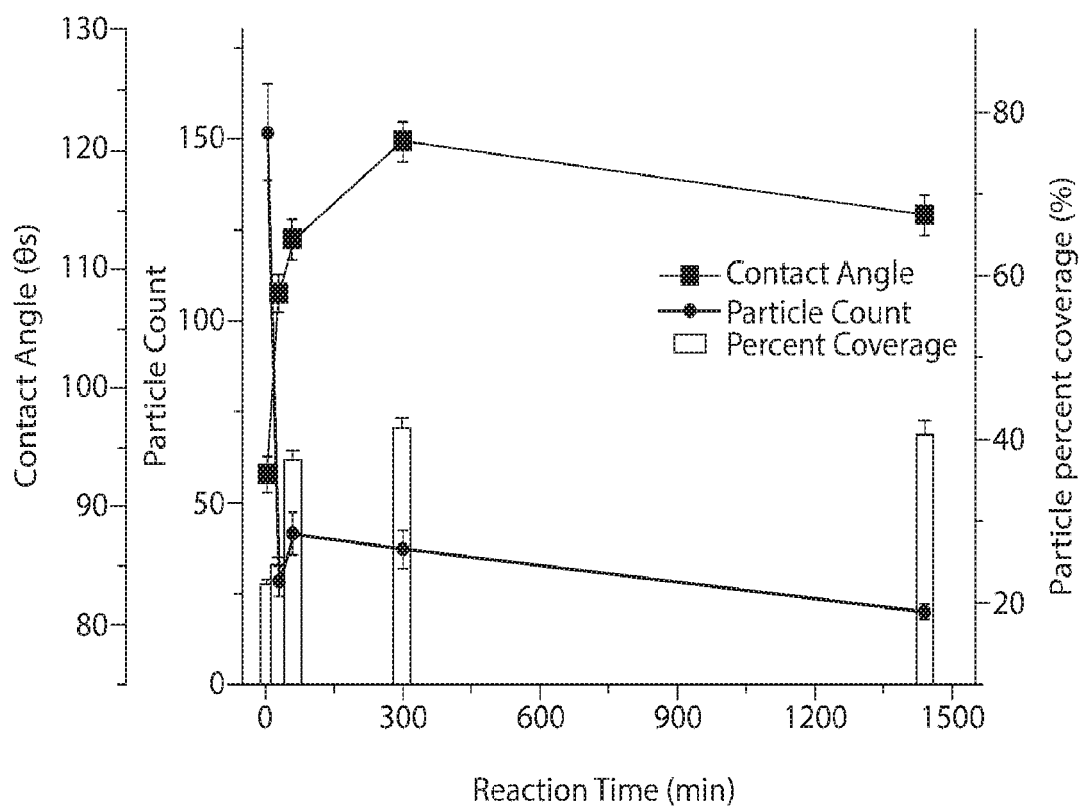
FIG. 7 is a graph depicting a relationship between reaction time, particle count, and particle coverage in accordance with one or more aspects of the invention.

FIG. 7. shows a graph correlating the evolution of particle size with surface hydrophobicity—capture by the static contact angles, $\theta_s$, with increasing reaction time. Changes in surface wettability with water follow the same trend as the size of the particles with a maximum value at 60 minutes. As shown in FIG. 7, extended reaction times leads to a decrease in the longitudinal size of the surface particles and concomitant drop in $\theta_s$.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A method of controlling a degree of hydrophobicity of a surface of a substrate, wherein the surface of the substrate has hydroxyl groups and surface-adsorbed water molecules thereon, the method comprising:
    oligomerizing silane monomers with the surface-adsorbed water molecules present on the surface of the substrate to form silane oligomers and expose the hydroxyl groups on the surface of the substrate;
    reacting the silane oligomers with the exposed hydroxyl groups to covalently bind the silane oligomers onto the surface of the substrate;
    polymerizing the covalently bound silane oligomers with remaining surface-adsorbed water molecules and additional silane monomers and/or additional silane oligomers to form a plurality of discrete, spherical, surface-attached hydrophobic micro- and/or nano-particles comprising silane polymers; and
    controlling a size of each of the plurality of surface-attached hydrophobic micro- and/or nano-particles and a proximity of each of the surface-attached hydrophobic micro- and/or nano-particles relative to each other.

2. The method of claim 1, wherein the substrate is hydrophilic.

3. The method of claim 2, wherein the substrate is a porous material.

4. The method of claim 3, wherein the substrate is cellulose.

5. The method of claim 1, wherein the substrate is silicon.

6. The method of claim 1, further comprising controlling an amount of surface-adsorbed water molecules present on the surface of the substrate.

7. The method of claim 1, wherein the polymerizing comprises controlling a rate of crosslinking of silane polymers.

8. The method of claim 1, wherein the substrate comprises a pre-patterned microfibril network and the reacting occurs at predetermined positions on the pre-patterned microfibril network.

9. The method of claim 1, further comprising delivering the silane monomers via chemical vapor deposition.

10. The method of claim 9, wherein chemical vapor deposition is performed at or below atmospheric pressure.

11. The method of claim 10, wherein chemical vapor deposition is performed at a predetermined temperature in the range of about 25° C. to about 100° C. to optimize an evaporation rate and reaction rate during bonding.

12. The method of claim 1, further comprising controlling one or more of temperature and reaction time.

13. The method of claim 1, further comprising controlling a surface roughness by controlling the rate of crosslinking of silane polymers during polymerization.

14. The method of claim 1, wherein controlling a size of each of the plurality of surface-attached hydrophobic micro- and/or nano-particles and a proximity of each of the surface-attached hydrophobic micro- and/or nano-particles relative to each other comprises forming a surface-attached hydrophobic film.

* * * * *